United States Patent Office 2,956,323
Patented Oct. 18, 1960

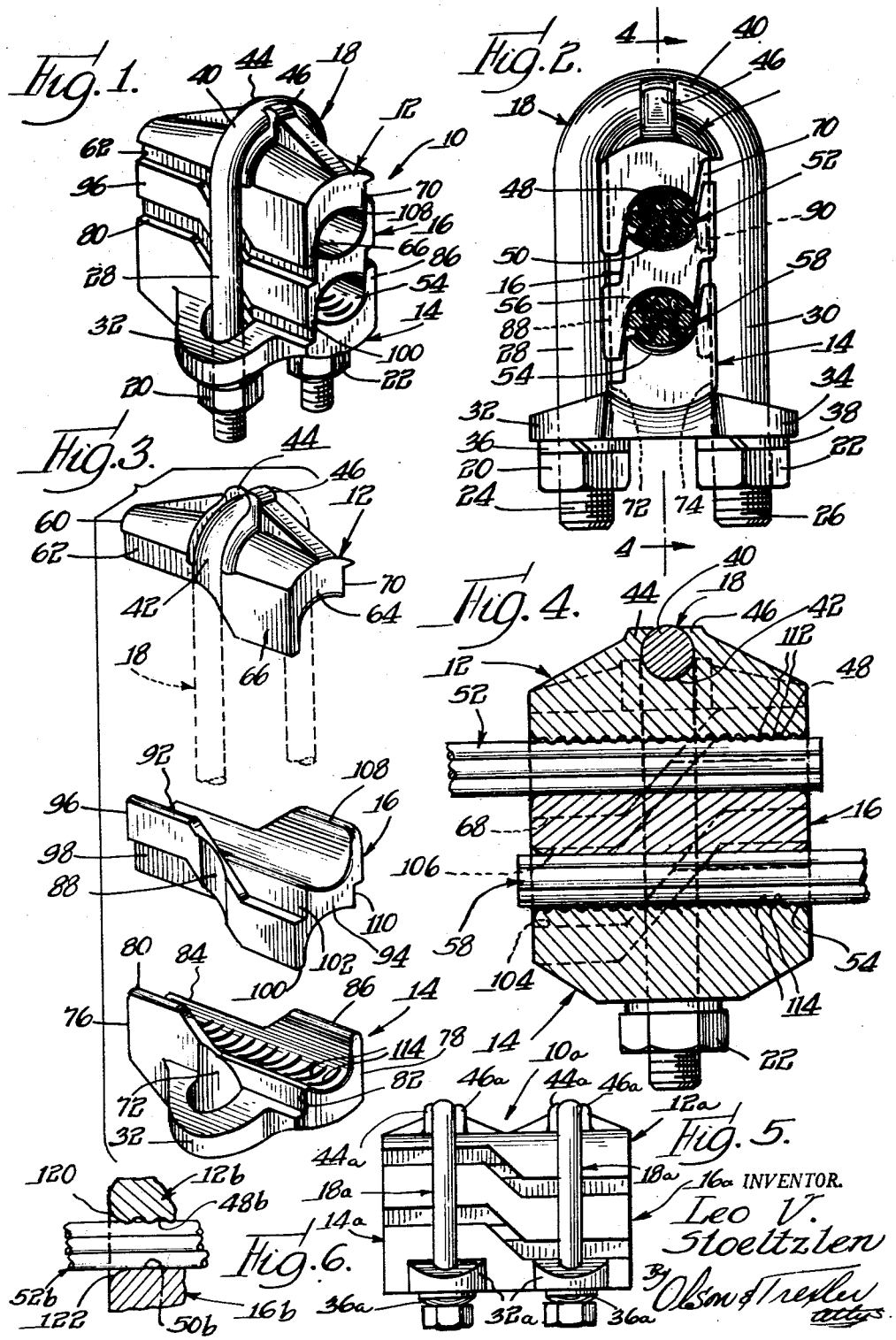

2,956,323
CONNECTOR

Leo V. Stoeltzlen, Erie, Pa., assignor to Penn-Union Electric Corporation, Erie, Pa., a corporation of Pennsylvania Filed Sept. 5, 1956, Ser. No. 608,088
5 Claims. (Cl. 24—125)

The present invention relates to a novel clamp, and more particularly to a novel clamp adapted to connect a plurality of electrical cables or other similar elements.

The present invention contemplates a clamp of the type including opposed body members and an intermediate member, which members are formed so that cables or the like may be secured between opposite sides of the intermediate member and each of the body members. With heretofore proposed clamps of the general type contemplated herein, the various members frequently become misaligned and the cables frequently slip or are squeezed at least partially from between the members during application of the device to the cables. Also, cables formed from aluminum which has a cold flow property may fail unless the cable is peripherally enclosed over a generous clamping area so as to prevent the material from "creeping" from between the clamp members under the high clamping forces. Thus, such prior devices are often relatively difficult properly to apply to the cables and may not satisfactorily retain cables made from aluminum or the like.

It is an important object of the present invention to provide a novel clamping device or connector of the above described type which is constructed so that the body and intermediate members are automatically maintained substantially in alignment with each other during application of the device to the cables.

A further object of the present invention is to provide a novel clamp or connector having opposite sides and intermediate members which are constructed so as to accommodate cables of various sizes and so as to prevent cables or the like from being squeezed outwardly from between the members or from inadvertently slipping from between the members during and after application of the device to the cables.

Still another object of the present invention is to provide a novel clamping device of the above described type which has improved holding power or resistance to axial slipping of the cables or the like relative to the device after the device has been fully applied to the cables.

Still another object of the present invention is to provide a novel clamping device or connector of the above described type which is of simple and rugged construction and may be quickly and easily applied to the cables or similar elements.

Other objects and advantages of the present invention will become apparent from the following description and the accompanying drawings wherein:

Fig. 1 is a perspective view showing a clamping device or connector embodying the features of the present invention;

Fig. 2 is an end elevational view of the novel clamping device or connector and shows in cross section a pair of cables clamped between the members of the device;

Fig. 3 is an exploded perspective view of the clamping device or connector of the present invention;

Fig. 4 is a sectional view taken along line 4—4 in Fig. 2;

Fig. 5 is an elevation on a reduced scale showing a modified form of this invention; and Fig. 6 is a fragmentary sectional view showing a further modification.

Referring now more specifically to the drawings wherein like parts are designated by the numerals throughout the various figures, a cable clamp 10 incorporating the features of the present invention includes opposite side body members respectively generally designated by the numerals 12 and 14 and an intermediate member 16. The members 12 and 14 are formed from high strength alloys, and the intermediate member 16 is preferably formed from a relatively soft metal having high conductivity. The relatively soft member will "flow" sufficiently under clamping pressure to enter between the strands of the cables to improve electrical contact, and also, the gripping or holding power of the connector or clamp. A U-bolt 18 centrally embraces the members and is adapted to receive nut members 20 and 22 on threaded end portions 24 and 26 of its opposite legs 28 and 30 for clamping the members together. The bolt leg portions 28 and 30 respectively extend through apertured lateral extensions or wings 32 and 34 of the body member 14, which lateral extensions provide relatively broad flat surfaces for cooperating with the nut members. Preferably, lock washers 36 and 38 are assembled on the bolt between the nut members 20 and 22 and their associated lateral extensions or wings.

In order to minimize the number of separate parts which must be handled by a workman and to facilitate application of the clamping device to a pair of cables or the like, the U-bolt is permanently connected to the body member 12. More specifically, the closed or rounded end 40 of the U-bolt is partially received within a complementary seat or groove 42 formed in the body member 12, and a pair of short upstanding projections or lugs 44 and 46 on the body member are formed over the closed end of the bolt so that the bolt is permanently secured in assembled relationship by the projections and is maintained in a plane substantially perpendicularly to the axis of the body member 12 by the walls of the groove 42. It has been found that by making the lugs or ears 44 and 46 relatively short, any danger of the lug cracking when they are formed over the bolt is substantially eliminated.

The members 12 and 16 are respectively provided with axially extending opposing work engaging surfaces 48 and 50 having arcuate cross sectional shapes as shown in Fig. 2 for accommodating a cable 52 or other elongated element. The body member 14 and the intermediate member are also respectively provided with opposing work engaging surfaces 54 and 56 for accommodating a second cable or workpiece 58 as shown in Fig. 2. It is important to note that the body members and intermediate member are provided with complementary recesses and side flanges or extensions which serve not only to maintain the members substantially in alignment with each other but also to provide a complete peripheral enclosure for the workpieces or cables of various sizes or diameters during initial as well as final stages of assembly of the clamping device and cables whereby positively to prevent the cables from slipping between the members or from being partially squeezed from between the members. More specifically, one side of a first end portion 60 of the body member 12 is provided with a recess 62 and the same side of an opposite end portion 64 is provided with an extension or flange 66. The opposite sides of these end portions are oppositely formed or, in other words, the opposite side of the end portion 60 is provided with a flange or extension 68 and the opposite side of the end portion 64 is provided with a recess 70.

Opposite sides of a central portion of the body member 14 are respectively provided with shallow grooves 72 and 74 for partially accommodating the legs of the U-bolt, and end portions 76 and 78 extending oppositely from these grooves are provided with recesses and flanges similar to those mentioned above. More specifically, the end portion 76 is provided with a side flange or extension 80 at the same side as the recess 62 in the end portion 60 of the body member 12 while the same side of the body member end portion 78 is provided with a recess 82. The opposite sides of the end portions 76 and 78 are respectively provided with a recess 84 and a flange 86.

The intermediate member 16 is also provided with centrally located opposite side shallow grooves 88 and 90 for partially accommodating the U-bolt, and opposite end portions 92 and 94 of this member are provided also with side recesses and extensions or flanges. More specifically, one side of the end portion 92 is provided with a flange 96 adapted to extend into the recess 62 of the body member 12, and this side of the end portion 92 is also provided with a recess 98 adapted to receive the flange 80 of the body member 14. The same side of the end portion 94 of the body member 16 is provided with a similar but oppositely arranged flange 100 adapted to extend into the recess 82 of the body member 14 and a recess 102 adapted to receive the flange 66 of the body member 12. The opposite side of the end portion 92 is provided with a downwardly extending flange 104 for projecting into the recess 84 of the body member 14 and an upwardly opening recess 106 for accommodating the depending flange 68 of the body member 12. The opposite side of the end portion 94 is provided with a similar but upwardly extending flange 108 for projecting into the recess 70 of the body member 12 and a downwardly opening recess 110 for accommodating the upwardly extending flange 86 of the body member 14. It should be noted that the symmetrical arrangement of the flanges and recesses in the members 12, 14 and 16 enables the members to be assembled together regardless of whether or not one or more of the members are turned around from the position shown since, for example, the end portion 94 of the intermediate member can accommodate the end portions 60 and 76 of the body members just as well as the end portion 92. Thus, assembly of the clamping device is facilitated since a workman need not pay any particular attention to the arrangement of the members with respect to each other. It should further be noted that the inner end edges of the flanges are diagonally arranged and traverse the central portions of the members so as to provide the members with centrally located side wall portions of an overall width which permits the above mentioned U-bolt accommodating grooves to be formed with increased overall effective length. This provides a greater positive interlock between the U-bolt and the members which prevents the members from slipping axially relative to each other and also tends to maintain the members in alignment with each other.

It is to be noted that in the embodiment shown, the work engaging surfaces 48 and 54 of the members 12 and 14 respectively are provided with longitudinally spaced and transversely extending ribs 112 and 114. When the device is clamped onto the workpieces or cables, the ribs 112 and 114 are forced to embed themselves in the workpieces so as to provide a positive interlock between the workpieces and the body members 12 and 14 and thereby greatly improve the holding power of the clamping device. If desired, similar ribs or protuberances may be provided on the work engaging surfaces 50 and 56 of the intermediate member further to increase the holding power of the device.

Fig. 5 shows a modified embodiment of the invention which is similar to the above described structure as indicated by the application of identical reference numerals with the suffix "a" added to corresponding parts. In this embodiment two U-bolts 18a are provided and are respectively positioned around intermediate sections of opposite end portions of the members 12a, 14a and 16a so as to distribute the clamping pressure more uniformly. The members are provided with pairs of grooves or seats for accommodating the bolts. Pairs of lugs or ears 44a and 46a are provided on the member 12a and pairs of wings 32a and wings similar to the above described wing 34 are provided on the member 14a for accommodating the bolts. Belleville or dish-type lock washers 36a are provided in the embodiment and may also be provided in the above described structure for maintaining the locking pressure even though some flow of the cable material may occur. It is to be understood that the structure may be further modified to include any additional numbers of U-bolts as may be required by the conductor size or environmental operating conditions.

In many cases it may be desirable to provide the connector bodies with flared mouths at the ends of the clamping surfaces to reduce any possibility of vibration failure of the cables as a result of chaffing. This is partially shown in Fig. 6 wherein the clamping surfaces 48b and 50b have flared or bevelled end sections 120 and 122.

While the preferred embodiments of the present invention have been shown and described herein, it is obvious that many structural details may be changed without departing from the spirit and scope of the appended claims.

The invention is claimed as follows:

1. A clamping device of the type described and comprising first and second oppositely disposed end body members of substantially equal length and each having a work-engaging surface facing the other body member, each of said body members having at diagonally opposed sides thereof flanges projecting toward the opposite body member and extending along substantially half the length of the associated body member with the flanges of each body member positioned to lengthwise complement the flanges on the other body member, an intermediate member disposed between said body members and substantially co-extensive in length therewith and having opposite work-engaging surfaces respectively opposing the work-engaging surfaces on said body members, a pair of flanges along substantially one half the length of each side of said intermediate member with the flanges along opposite sides at each end of the body member extending in opposite directions and with one pair of flanges at diagonally opposed sides of the intermediate member projecting toward the first body memebr to lengthwise complement the flanges thereon and with the other pair of diagonally disposed flanges extending in the opposite direction to lengthwise complement the flanges on the other body member, each of said flanges closely lapping the adjacent side surface of an adjacent member as a substantial continuation of the work-engaging surface from which it extends to substantially completely enclose the work clamping area between the adjacent work-engaging surfaces and substantially prevent misalignment and lateral escape under pressure of the clamped workpieces, and means associated with said members for drawing the same together to clamped position.

2. A clamping device as claimed in claim 1, wherein each said body and intermediate members has portions of the side surfaces thereof relieved to receive the flanges on an adjacent member.

3. A clamping device as claimed in claim 1, wherein the means for clamping together the members comprises a U-bolt and wherein the side surfaces of the intermediate member are provided with transverse grooves receiving the legs of said U-bolt.

4. A clamping device as claimed in claim 1, wherein the means for clamping together the members comprises a pair of U-bolts overlying the first body member and wherein the flanges on said intermediate member lapping the said first body member are transversely grooved to receive one leg of each U-bolt.

5. A clamping device as claimed in claim 1, wherein the means for clamping together the members comprises a U-bolt positioned substantially centrally of the device and wherein the flanges on each side of the intermediate member are joined by diagonal connecting portions providing surfaces in which transverse grooves are formed for receiving the legs of the U-bolt.

References Cited in the file of this patent

UNITED STATES PATENTS

| | | |
|---|---|---|
| 1,420,790 | Varney | June 27, 1922 |
| 1,450,528 | Varney | Apr. 3, 1923 |
| 1,811,154 | Reilly | June 23, 1931 |
| 1,945,575 | Sumpter | Feb. 6, 1934 |
| 2,432,635 | Van Ryan | Dec. 16, 1947 |
| 2,573,710 | Holke | Nov. 6, 1951 |
| 2,771,591 | Vortriede | Nov. 20, 1956 |

FOREIGN PATENTS

| | | |
|---|---|---|
| 532,344 | Great Britain | Jan. 22, 1941 |

OTHER REFERENCES

Electrical World, March 19, 1956, page 191.